United States Patent Office.

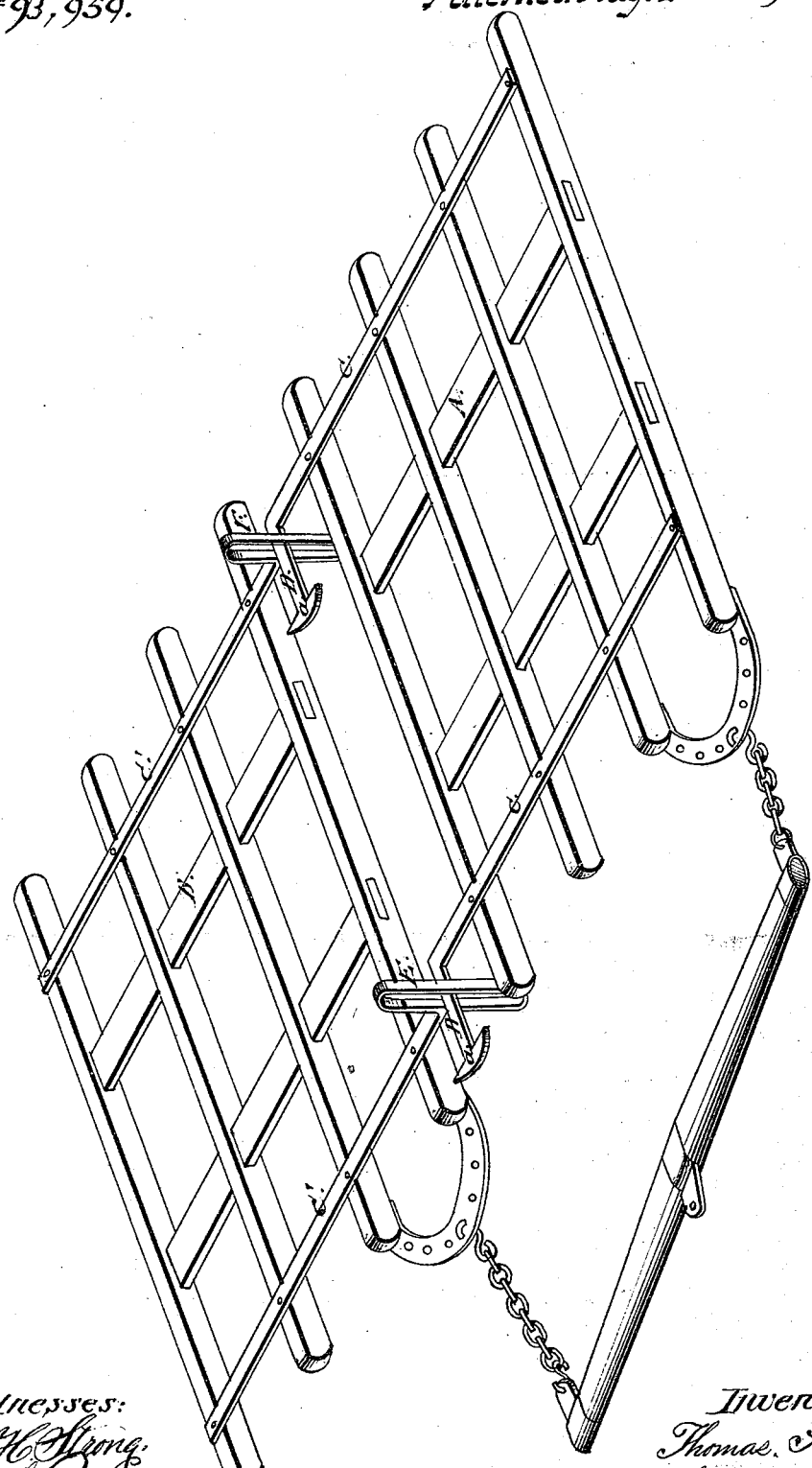

THOMAS SANDS BROWN AND THOMAS ARCHER BROWN, OF BROOKLYN, CALIFORNIA.

Letters Patent No. 93,959, dated August 24, 1869.

IMPROVEMENT IN HARROW.

The Schedule referred to in these Letters Patent and making part of the same.

*To all whom it may concern:*

Be it known that we, THOMAS SANDS BROWN and THOMAS ARCHER BROWN, of Brooklyn, county of Alameda, State of California, have invented an Improved Harrow; and we do hereby declare the following description and accompanying drawings are sufficient to enable any person skilled in the art or science to which it most nearly appertains, to make and use our said invention or improvement without further invention or experiment.

Our invention relates to an improvement in harrows for pulverizing the soil after it has been turned over by the plow, in order to more thoroughly prepare it for seeding; and it relates more particularly to that class in which two harrow-frames are connected together, so as to work side by side, being generally connected by a hinge or other joint.

Our improvement consists in a new and improved manner of connecting the two harrows, so that each will perform effective work, no difference how uneven the ground may be over which they are drawn, the connection being such that each frame is allowed to move up and down, and back and forth a certain distance, independent of the other.

To more fully explain our invention, reference is had to the accompanying drawings, and letters marked thereon, forming a part of this specification, which represents a perspective view, showing the harrows or frames and their connection with each other.

A and B are the two corresponding frames or harrows, which it is desired to connect together, in order to form a double harrow. These frames may be constructed in any of the usual styles employed in the construction of the ordinary harrows, and of any desired shape.

To connect these two harrows, we employ metal bars or rods C C C' C'.

The bars C C, on the frame A, are attached to one of the harrows near each end, and are fastened either to a part or all of the longitudinal timbers of the frame.

One end of these bars extends beyond the outside timber of the frame, and is bent, so as to form arms D parallel to the harrow-timbers, on the outer end of which is formed a head, *a*.

The bars C' C', on the frame B, are attached in the same manner as above described, and have formed on their projecting ends the vertical loops E.

In order to connect the two together, the two frames are placed at right angles to each other, and the heads *a* of the arms D inserted into the loops E, thus, when the harrows are extended upon the ground, connecting them in such a manner that they cannot be separated without again placing them at right angles to each other.

By this arrangement the harrows are allowed an independent motion back and forth on the ground equal to the length of the arm D, and also an independent movement up and down equal to the length of the loop E, thus greatly facilitating the harrowing of the ground by allowing each harrow to accommodate itself to the conformation or unevenness of the ground, insuring a thorough pulverization of the soil.

This harrow also equalizes the draught between the horses employed for drawing it, as the latitude of motion of each separate frame will cause each horse to draw his own side of the harrow, and the horses will not be so likely to gall on account of the heat and rubbing of the collar, as the back-and-forward motion of the harrow will relieve the steady strain on the collar, thus allowing the air to pass between the collar and the shoulder, and prevent chafing, by keeping the shoulders cool.

Having thus described our invention,
What we claim, and desire to secure by Letters Patent, is—

1. The bars C, having the arms D, said arms being provided with a head, *a*, substantially as and for the purpose above described.

2. In combination with the bars C above claimed, the bars C', provided with the loops E, substantially as and for the purposes set forth.

3. Connecting the two harrows A and B together by means of loops and arms, substantially as herein described.

In witness whereof, we have hereunto set our hands and seals.

THOMAS S. BROWN. [L. S.]
THOMAS A. BROWN. [L. S.]

Witnesses:
WILLIAM STANIFORTH,
JOHN L. BOONE.